Patented Dec. 14, 1926.

1,611,056

UNITED STATES PATENT OFFICE.

LUDWIG MOSTNY, OF LINZ-ON-THE-DANUBE, AUSTRIA.

PROCESS OF MAKING ARTIFICIAL SPONGES.

No Drawing. Application filed November 21, 1925, Serial No. 70,711, and in Austria February 25, 1925.

It has been proposed heretofore to manufacture artificial sponges from cellulose derivatives (esters), by mixing a solution of a cellulose ester with a pore-forming substance and if desired a fibrous substance too, and then saponifying the ester, to regenerate the cellulose, and washing out the pore-forming substance. This process has not proved satisfactory. Another method consists in treating a mixture of viscose and crystals with hot air, whereby the cellulose is regenerated and the crystals are dissolved out by water or alkali solution derived from the viscose. In another process the cellulose is regenerated by means of acid.

These processes have defects which render elaborate precautions necessary in order to secure any useful result from them.

With the process in which hot air is used as described the heat evaporates the greater part of the water, so that the alkali used for dissolving the cellulose ester, or derived from decomposition of the viscose, is left in a state of concentrated solution, which attacks the structure of the fabric and breaks down a substantial proportion of the cellulose, so that there is considerable loss of material. Moreover, only a small proportion of the crystals is removed by this solution, and subsequent treatment, as by washing with warm water, is required. As the reaction requires some considerable time the formation of pores is not uniform or perfect, because on the one hand the crystals tend to settle, and on the other hand the pores formed tend to close up again.

The acid process also has the defect of requiring considerable time, which renders it expensive and reduces the strength of the material, as the acid action at the surface, more particularly in the case of large sponges, breaks down the cellulose, while within the substance there is still a core of viscose gel, to which the acid obtains access very slowly. Moreover the production of hydrogen sulphide from the thiocarbonate in the viscose, and the introduction of sulphur into the final product, are undesirable.

According to my invention these defects are removed by introducing steam into a chamber containing the mixture, so that the steam decomposes the viscose and causes cellulose hydrate to be re-formed. The advantage of this process is mainly due to the fact that owing to the high specific heat of steam the chemical action is very rapid. The steam treatment entirely eliminates the injurious effect of the concentrated alkali solution referred to in connection with the hot air treatment, because as soon as saponification is started by the steam part of the steam is condensed and dilutes the alkali solution and the deleterious products of decomposition of the ester (mainly alkali compounds), which are quickly carried away. Moreover, the fact that the filler (i. e. the pore-former) and the by-products of saponification are carried away by the water of condensation practically in their entirety is of very great importance as regards the economy of the process, because it greatly simplifies the recovery of the alkali and pore-former, and the utilization of by-products, for example sulphur compounds. The washing of the final product, hitherto a long process, is reduced to a very short operation.

The saponification being effected by means of alkali, de-sulphurization occurs when viscose is used. Consequently with the steam process one obtains both rapid formation and elimination of the deleterious by-products, but also a rapid cleansing and separation of the substances to be regenerated. Where other cellulose esters are used, for example nitrocellulose, a reducing agent must be used in the known manner in the saponifying process, for example ammonium sulphide.

Example:—160 grams of a 20% viscose solution are intimately mixed with 16 grams of fibre (for example cotton, hemp, flax or the like) and 1.2 kg. of sodium sulphate or other easily melted or dissolved substance, the mixture being shaped as required. This mixture is treated with steam at a pressure of ½ to 10 atmospheres, for from 15 minutes to 4 hours. The resultant spongy mass is thoroughly washed with water, bleached, and dyed as required.

What I claim as my invention and desire to secure by Letters Patent of the United States is:—

1. The process of producing an artificial sponge consisting in mixing a solution of cellulose ester with pore-forming material, treating the mixture with steam from a source external to the mixture, and separating the pore-forming material.

2. The process of producing an artificial sponge consisting in mixing a solution of cellulose ester with liquefiable pore-forming material, treating the mixture with steam from a source external to the mixture, and separating the pore-forming material.

3. The process of producing an artificial sponge consisting in mixing a solution of cellulose ester with a liquefiable pore-forming material and a fibrous material, treating the mixture with steam from a source external to the mixture, and separating the pore-forming material.

In witness whereof I have signed this specification.

LUDWIG MOSTNY.